United States Patent [19]
Wu

[11] Patent Number: 5,581,643
[45] Date of Patent: Dec. 3, 1996

[54] OPTICAL WAVEGUIDE CROSS-POINT SWITCH

[75] Inventor: Chi Wu, Nepean, Canada

[73] Assignee: Northern Telecom Limited, Montreal, Canada

[21] Appl. No.: 352,406

[22] Filed: Dec. 8, 1994

[51] Int. Cl.[6] .................................................. G02B 6/35
[52] U.S. Cl. ............................................. 385/17; 385/18
[58] Field of Search ........................................ 385/16–23

[56] References Cited

U.S. PATENT DOCUMENTS

| | | | |
|---|---|---|---|
| 4,580,873 | 4/1986 | Levinson | 385/17 |
| 4,618,210 | 10/1986 | Kondo | 385/17 |
| 4,630,883 | 12/1986 | Taylor et al. | 385/17 X |
| 4,813,757 | 3/1989 | Sakano et al. | 385/16 |
| 4,846,542 | 7/1989 | Okayama et al. | 385/17 |
| 5,013,113 | 5/1991 | Soref | 385/17 |
| 5,367,584 | 11/1994 | Ghezzo et al. | 385/17 |

FOREIGN PATENT DOCUMENTS

| | | | |
|---|---|---|---|
| 0310184 | 9/1988 | European Pat. Off. | G02B 6/12 |
| 63-197923 | 8/1988 | Japan | 385/17 |
| 2-179621 | 7/1990 | Japan | 385/17 |
| 6-186598 | 7/1994 | Japan | 385/17 |

OTHER PUBLICATIONS

"Lossless and Low–Crosstalk Characteristics in an InP–Based 2×2 Optical Switch", Kirihara et al, IEEE Photonics Technology Letters, vol. 5, No. 9, Sep. 1993, Pp. 1059–1061.

"First 8×8 Semiconductor Optical Matrix Switches Using GaAs/AlGaAs Electro–Optic Guided–Wave Directional Cuplers", Hamamoto et al, Electronics Letters, 27th Feb. 1992, vol. 28, No. 5, pp. 141–143.

"8×8 Ti:LiNbO3 Waveguide Digital Optical Switch Matrix", Okayama et al, IEEE Trans. Commun., vol. E77–B, No. 2, Feb. 1994, pp. 204–208.

"Vertical Multiple–Quantum–Well Directional–Coupler Switch with Low Switching Voltage", Yamaguchi et al, IEEE Photonics Technology Letters, vol. 4, No.7, Jul. 1992, pp. 723–725.

"A Very Low Operation Current InGaAs/InP Total Internal Reflection Optical Switch Using p/n/p/n Current Blocking Layers", Oh et al, IEEE Photonics Technology Letter, vol. 6, No. 1, Jan. 1994, pp. 65–67.

"Strictly Nonblocking 16×16 Matrix Switch Using Silica–Based Planar Lightwave Circuits", Okuno et al, 20th European Conference on Optical Current, Sep. 25–29, 1994, Firenze, Italy, pp. 83–86.

(List continued on next page.)

Primary Examiner—John D. Lee
Attorney, Agent, or Firm—George MacGregor

[57] ABSTRACT

An optical waveguide cross-point switch capable of full broadcast and strictly non-blocking operation. The device has a matrix of a plurality of input waveguides and a plurality of output waveguides (M×N). A reflecting surface associated with each intersection may be selectively activated to direct an optical signal on the input line to the associated output line. The reflecting surface may also be employed so as to convert an M×N matrix into a 2 (M×N) rearrangeable cross-point switch. Each waveguide is capable of switching a data rate of 10 Gb/s or more. For example, with eight wavelength channels used to impart optical signals to a 16×16 switch a data rate of 1.28 Terabits/second is achievable.

23 Claims, 11 Drawing Sheets

OTHER PUBLICATIONS

"Monolithically Integrated 4×4 InGaAsP/InP Laser Amplifier Gate Switch Arrays", Gustavsson et al, IEEE LEOS '93, San Jose, CA, Nov. 1993, pp. 187–188.

"An InGaAs/GaAs MQW Optical Switch Based on Field–Induced Waveguides", Stöhr et al, IEEE Photonics Technology Letters, vol. 6, No. 7, Jul. 1994, pp. 828–830.

"Monolithically Integrated 4×4 InGaAsP/InP Laser Amplifier Gate Switch Arrays", Gustavsson et al, Electronics Letters Nov. 1992, vol. 28, No. 24, pp. 2223–2224.

"A Polarization–Controlled Free–Space Photonic Switch Based on a PI–LOSS Switch", Nishi et al, IEEE Photonics Technology Letters, vol. 5, No. 9, Sep. 1993, pp. 1104–1106.

"Strictly Nonblocking 8×8 Integrated Optical Switch Matrix", Granestrand et al, Electronics Letters, 17th Jul. 1986, vol. 22, No. 15, pp. 816–818.

"1.3 um InP/InGaAsP Digital Optical Switches with Extinction Ratio of 30 dB", Choudhury et al, IEEE LEOS '93, San Jose, CA, Nov. 1993, pp. 494–495.

"InP–Based Optical Switch Module Operating Through Carrier–Induced Refractive Index Change", Inoue et al, Optical Engineering, Mar. 1990, vol. 29, No. 3, pp. 191–199.

"A Novel Integrated–Twin–Guide (ITG) Optical Switch With A Built–In TIR Region", Baba, et al, IEEE Photonics Technology Letters, vol. 4, No. 5, May 1992, pp. 486–488.

"New compact Polarisation Insensitive 4×4 Switch Matrix on InP with Digital Optical Switches and Integrated Mirrors", Vinchant et al, Proceedings ECOC'93, vol. 3, Paper Th C12, pp. 13–16 (1993–No Month).

"Pigtailed Tree–Structured 8×8 LiNbO3 Switch Matrix with 112 Digital Optical Switches", Granestrand et al, IEEE Photonics Technology Letters, vol. 6, No. 1, Jan. 1994, pp. 71–73.

"Weighted–Coupling Y–Branch Optical Switch in InGaAs/InGaAlAs Quantum Well Electron Transfer Waveguides", Khan et al, IEEE Photonics Technology Letters, vol. No. (?), Mar. 1994, 3 pp.

"First Digital Optical Switch Based On InP/GaInAsP Double Heterostructure Waveguides", Cavailles et al, Electronics Letters, 25th Apr. 1991, vol. 27, No. 9, pp. 699–700.

Aronson, L. B., et al, "Analysis and Demonstration of an Integrated Optical Switch Based on Dynamic Free Carrier Gratings: A Blueprint for a 100 × 100 Element Switch Array", IEEE Journal of Quantum Electronics, vol. 30, No. 10, Oct. 1994, pp. 2332–2349.

Okuno, M., et al, "Strictly Nonblocking 16×16 Matrix Switch Using Silica–Based Planar Lightwave Circuits", 20th European Conference on Optical Communication, Proceedings, vol. 4, Sep. 25–29, 1994, pp. 83–86.

Gustavsson, Mats, et al, "Monolithically Integrated 4×4 InGaAsP/InP Laser Amplifier Gate Switch Arrays", LEOS '93 Conference Proceedings, IEEE Lasers and Electro–Optics Society, 1993 Annual Meeting, Nov. 15–18, 1993, pp. 187–188.

Baba, Satoshi, et al, "A Novel Integrated–Twin–Guide (ITG) Optical Switch with a Built–In TIR Region", IEE Photonics Technology Letters, vol. 4, No. 5, May 1992, pp. 486–488.

Ushikubo, T., et al, "AlGaAs/GaAs Directional Coupler Type 4×4 Optical Matrix Switch, " Optical Society of America, Optical Fiber Communication Conference, Feb. 6–9, 1989, p. 138.

Patent Abstracts Of Japan, vol. 10, No. 266 (P–496)(2322), Sep. 11/86, "Optical Switch Element".

Patent Abstracts Of Japan, vol. 13, No. 159 (P–858), "Optical Integrated Circuit". (Dec. 1988).

Inoue et al, "Carrier–Injection Type Optical $S^3$ Switch With . . . ", *IEEE Photonics Tech. Lett.*, vol. 2, No. 3, Mar. 1990, pp. 214–215.

OPTICAL WAVEGUIDE CROSS-POINT SWITCH

FIELD OF INVENTION

This invention relates to cross-point switches and more particularly to full-broadcast, strictly non-blocking, optical waveguide, cross-point switches, which are compact and capable of high speed operation.

1. Background

The telecommunications industry is rapidly adopting optical transmission networks in order to achieve the bandwidth necessary to provide video and high speed data services. It is known that single mode optical fibers have the potential to propagate data having a bandwidth in the terabit range. Elements of the network which rely on electrical input such as switching, generally impose limitations on the achievable data rate. Consequently, future wide-band communication systems may require optical switching networks, especially for routing high-speed digital signals and for frequency-multiplexed channels in coherent communications. Direct switching of optical signals without electrical to optical conversion by using optical waveguide switches may be preferable because of the high switching speed, lack of limitation in signal bit rate, bidirectional switching, and conservation of optical wavelength.

There are mainly two concepts of N×N matrix architectures: the blocking or statically nonblocking matrix of the rearrangeable type and the nonblocking full cross point array, the so-called busbar structure. The rearrangeable matrix has the advantage that the number of switch points N(N−1)/2 is considerably reduced in comparison to the busbar structure with N×N switches, where N is the number of input and output ports. For rearrangeable type switches, however, since several switches are involved in establishing an interconnection, some information is lost during the time required for the rearrangement of the signal path, in the case of changing an interconnection. In the busbar structure, the activation of only one switch is sufficient to build up an interconnection from any of the inputs to any of the outputs. Therefore, this structure is most suitable for application in high data rate transmission systems. The present invention is a fully nonblocking optical cross point switch. Such optical switch matrices are expected to be important components in telecommunications systems, as they are capable of performing code- and frequency-transparent switching of optical signals without conversion to electrical form.

2. Prior Art

Commonly implemented digital multiplexing systems (DMS) are well suited to switching voice-based telecommunications at signal rates of 64 Kb/s. These systems are not, however, easily adaptable to the higher transmission rates of 10 Gb/s required for the SONET/SDH architectures.

Optical transmitters in the form of modulated diode lasers or CW laser with signal trains introduced by optical modulators are known to generate optical signals in the 10 Gb/s range and consequently, there is an identified need for systems capable of switching data signals at this rate.

One such system relies on a space switch concept wherein a signal on a first fiber is switched to a second fiber by means of a reflecting mirror which is activated by rotating the mirror into the optical path by electromechanical techniques. (A. Boissier et al, "Space Division Optical Switching System of Medium Capacity", SPIE, Vol. 585, 1985.) Obviously, such a system is incapable of sufficiently high speed to be useful in broadband transmission networks.

Another switching concept incorporates integrated optics in an optical deflection type cross-point matrix. Input signals are detected, regenerated, fed into a waveguide structure and reflected from an electro-optic grating to the output where the signal is detected and regenerated into the output fiber. The additional components required to detect and regenerate the signal at both the input and output limits the operating speed and increases size requirements. One system which operates on this concept employs an active device at each cross-point. The active device regenerates the light and redirects it from an input row of the matrix to an output column. This removes the need for an additional detector/regenerator pair but means that the switch is not strictly non-blocking. (G. W. Taylor et al, "Dynamic Switch Logic—A New Concept for Digital Optical Logic Using DOES Devices", Paper 27.4, IEDM 85, Washington, D.C.)

Figure 1A:
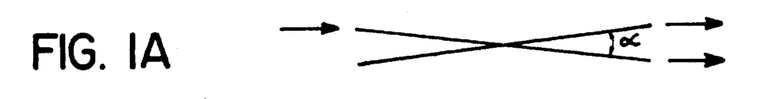
FIGS. 1A to 1F show basic switch elements and characteristics according to the prior art.
Figure 1B:
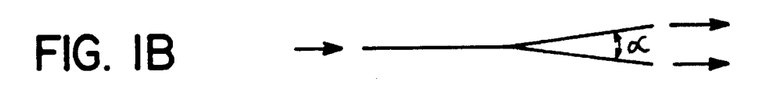
Figure 1C:
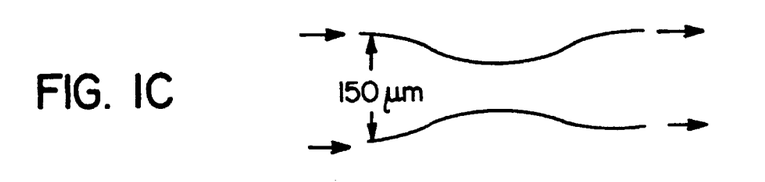

Other configurations according to the prior art incorporate X-branch, Y-branch or directional couplers as cross-point switches and are shown generally in FIGS. 1A, 1B and 1C. For further details see, for example, Yamaguchi et al, "Vertical Multi-Quantum Well Directional Coupler Switch With Low Switching Voltage", IEEE Photonics Technology Letters, Vol. 4, No. 7, July 1992, and Oh et al, A Very Low Operation Current InGaAsP/InP Total Internal Reflection Optical Switch Using p/n/p/n Current Blocking Layers, IEEE Photonics Technology Letters, Vol. 6, No. 1, January 1994. As shown in relation to FIGS. 1A and 1B the angle α should be less than 8° which requires that the switch structure must be long in order to achieve good waveguide separation and switching performance. Otherwise the radiation loss would be too large to have practical application. Further, a cross-point matrix consumes considerable material in order to incorporate even a limited number of input and output waveguides. Currently a 4×4 matrix switch requires in the order of 3×7 mm$^2$ when fabricated with a Y-branch coupler. (Gustavsson et al, "Monolithically Integrated 4×4 InGaAsP/InP Laser Amplifier Gate Switch Arrays", IEEE LEOS '93, San José, November 1993.)

The directional coupler shown in FIG. 1C is approximately 4.7 mm long with waveguides at the input and output ends separated by 150 μm for fiber coupling. A matrix of, say, 8×8 waveguides would be too large to be practical when considering integrated photonic circuits.

Figure 1D:
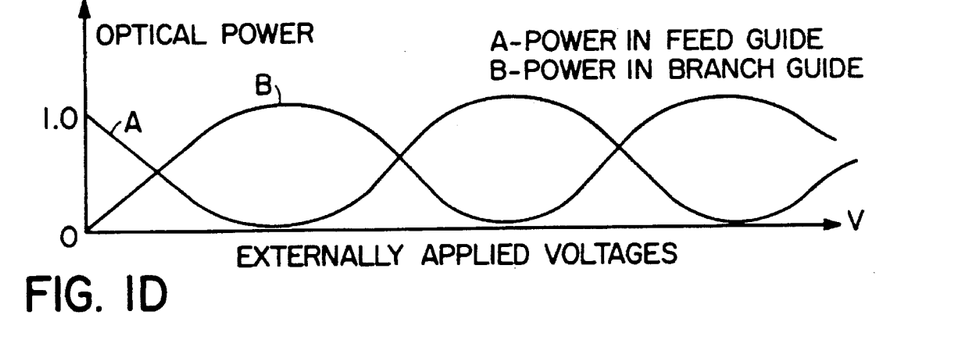

Though many optical switch elements have been demonstrated so far, the manufacturability is still a concern. The interference type X-, Y-, and directional coupler switches are based on two mode interference. They are called analog switches, since the optical power changes sinusoidally when external voltages are applied to the switches, as shown in FIG. 1D. The advantage of such switches is its short interaction length, which makes the device compact. Only for a perfectly designed and fabricated device can the maximum power be achieved in one guide, while the minimum power is output from another guide. Otherwise, the device will have a large cross-talk. In today's technology, it is hard to achieve a good fabrication uniformity across a large wafer, therefore, their applications in the switch matrices are limited. In order to overcome this problem, some modified device structures have been demonstrated, such as a stepped delta-beta directional coupler switch; where two electrodes have been employed on each waveguide in a directional coupler to compensate for the variation of the switching performance. Since the non-uniformity has a profile on a wafer, the switching voltages needed for each switch at different parts of the switch matrix will be different. This increases the control complexity and makes it impractical to manufacture a large switch matrix. Besides the control problem, such switches are also sensitive to the polarization state and wavelength of the input light signals.

Figure 1E:
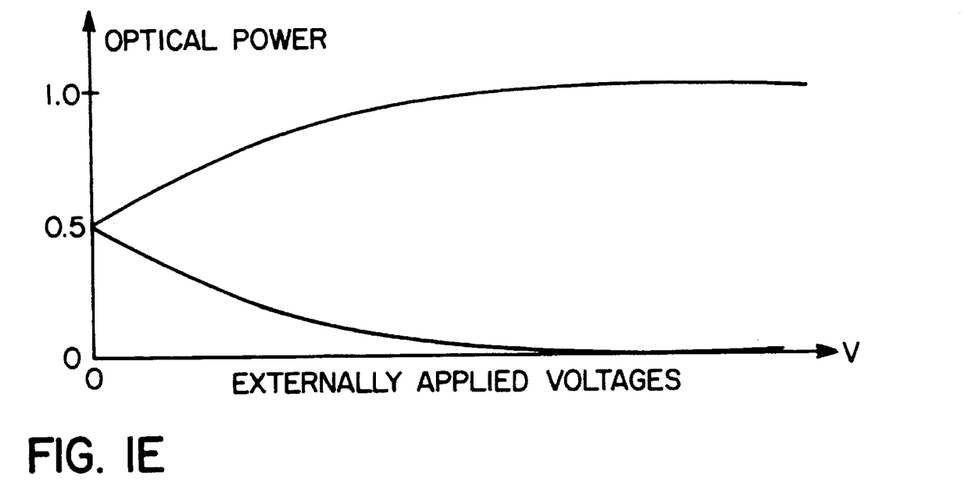

Another kind of switch, called a digital optical switch (DOS), is based on the adabatically, one mode evolution which has the advantage of being polarization independent, wavelength insensitive and less fabrication sensitive. Such switches can also be made using X-, Y-, and directional coupler switches. Its switching characteristic as shown in FIG. 1E is a step-function. For coupling with optical fibers, a large separation between two waveguides is required; this normally can be achieved by bending the waveguide. Since there is a requirement for adabatical mode evolution, the intersection angle must be small. This makes each switch rather long, normally a few millimeters in comparison with a few hundred micro-meters long for an analog switch.

Figure 1F:
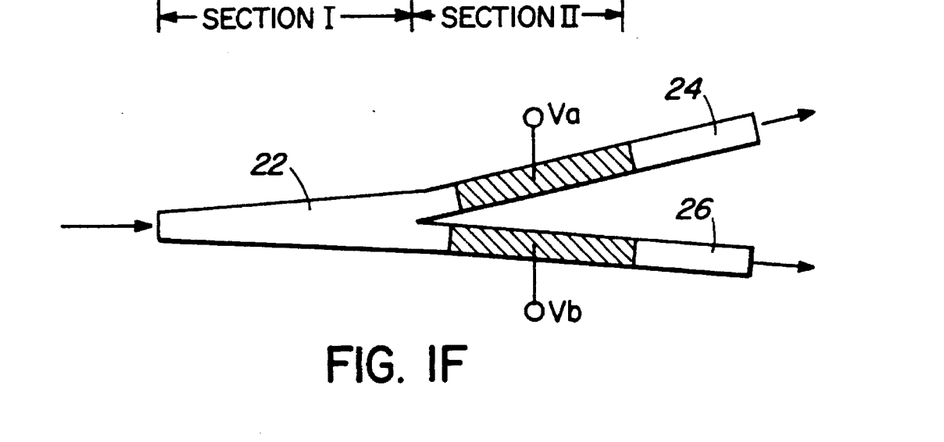

Normally, the optical switch is characterized by polarization and wavelength sensitivity, insertion loss, driving power and size, etc. Beside its large size, the currently demonstrated DOS has the disadvantage of large power consumption. FIG. 1F shows the top view of a typical Y-DOS structure containing a straight section 22 for light input and two branch sections 24,26, with electrodes A and B, to provide switching function. Electrically, it is a PIN structure with electrical contacts on the top and bottom of the waveguides. The light is fed into the straight waveguide 22 by an optical fiber (not shown). If both waveguides are not biased (no injection current to either electrode), the input light will be coupled into the two branch-guides with a 50% power splitting ratio in each arm 24,26. If electrode A is forward biased with a sufficient injection current, the refractive index of its waveguide core 24 will be lowered. As a result, waveguide 24 cannot guide light efficiently and nearly 100% of the input light will be switched from the input guide 22 into branch-guide 26. In a similar way, if electrode B is forward biased with a sufficient injection current, the input light will be switched from the input guide 22 into waveguide 24. If such a switch is used in a switch matrix, a broadcast function can be realized when all the switches are "off". For fully non-blocking switch application, one of the electrodes should be "on" in each switch. This will require 256 current sources in a 16×16 switch matrix. The current consumption and heat dissipation may be a concern.

The demonstrated X-, or Y- digital optical switches are quite long. For example, in FIG. 1F, Section I is 3 mm long and Section II is about 0.75 mm long. Long Section I is necessary due to a concern of the radiation mode. Normally, the optical mode of an optical fiber does not match the mode of a rectangular waveguide. When a single mode fiber is coupled with a rectangular waveguide, multi-modes will be excited in the rectangular waveguides. For efficient switching, the rectangular waveguide is designed to support a single mode only. The higher mode will become a radiation mode and gradually leak into the cladding layers (both lateral and vertical based on the geometry of the structure). For a conventional switch matrix, where the inputs and outputs have a common axis, the optical fiber at the output ends may pick up the radiation mode. This will decrease the extinction ratio of the switch. To overcome this problem, the switches are designed to have a long first section normally to allow the radiation mode to move away from the waveguide.

The switches of prior art switch matrices and as shown in FIGS. 1A, 1B and 1F are used in a cascaded configuration with coaxial input and output. See, for example, Okuno et al, "Strictly Nonblocking 16×16 Switch Using Silica Based Planar Lightwave Circuits", 20th European Conference on Optical Communications, Sep. 25–29, 1994, Firenze, Italy. Since each switch is long it is difficult to manufacture a large scale switch matrix on a small chip.

SUMMARY OF THE INVENTION

In view of the bandwidth capabilities of optical fibers there is a need to achieve high speed data switching by optical means while maintaining a compact configuration.

Figure 1G:
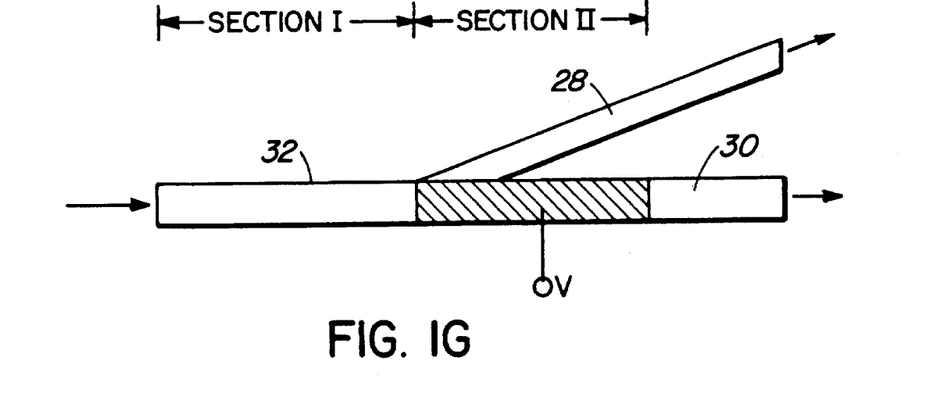
FIGS. 1G and 1H show the device structure and switching characteristic of the normally "on" digital optic Y-switch of the present invention.
Figure 1H:
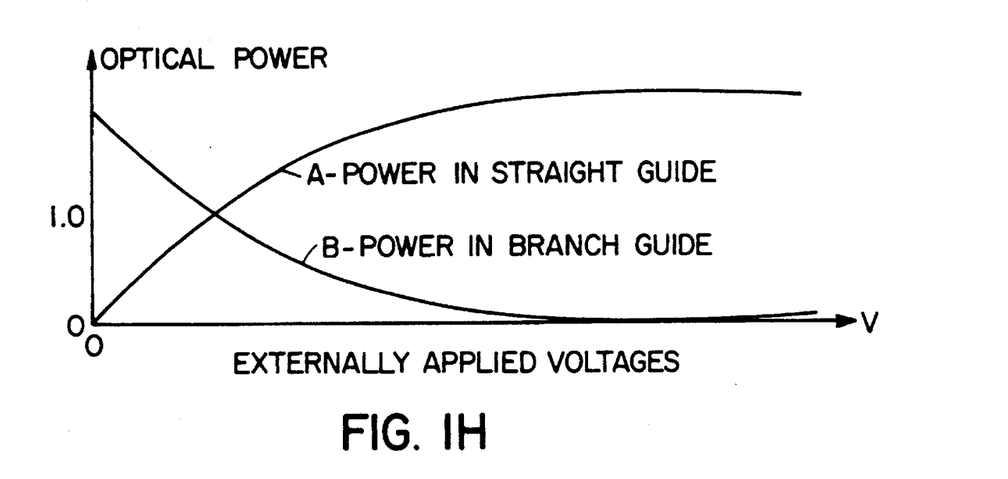

In this invention, along with a proposed switch matrix scheme, there is also proposed a normally "off" digital optical switch as shown in FIG. 1G in which the two branch-guides 28,30 are designed asymmetrically. The straight branch-guide 30 is designed to have a larger dimension (either wider width or thicker layer) than the other branch-guide 28. The electrical contacts are put on the straight branch-guide and the bottom of the waveguides. The PIN structure provides the possibility of electrically tuning the refractive index of the straight guide. When the electrode is "off", the input light from the input guide 32 will propagate through the straight guide 30. When the PN junction is forward biased with sufficient current injection, the effective refractive index of the straight branch-guide 30 will be lowered. This means the straight waveguide 30 does not guide light efficiently so that the input light will be switched into the other branch-guide 28 adabatically. The switching characteristics schematically illustrated in FIG. 1H shows its digital switching performance. For fully non-blocking switching applications, only 16 switches are turned "on" in a matrix. This is based on the situation where two electrodes at each corner can be combined into one and controlled by the same voltage or current supply. For broadcast application different voltages or currents are needed to control the two electrodes at each corner. Therefore, separate voltage or current supplies are required. A total of 2×16−1 supplies are needed. In either case the power consumption problem is ameliorated.

In the present invention, as will be described in greater detail, the reflective mirrors at each corner are etched deeply over the lower cladding layers. For a proper design, the corner mirrors only reflect the desired optical signals carried in the optical waveguide. The previous mentioned radiation modes will either be deflected to another direction or just propagate straight forward. The fiber at the output ends cannot detect those radiation modes easily, so that we can use a shorter first section in the design to achieve a compact switch.

By further optimizing the waveguide geometry, the rectangular waveguide mode can be designed to best match the fiber mode and the first section can be further shortened.

Accordingly, it is an object of the present invention to provide a fully non-blocking cross-point switch comprising a matrix of a plurality of intersecting input and output waveguides (M×N).

It is a further object of the invention to make dual utilization of each cross-point of an M×N matrix so as to form arearrangeable 2(M×N) matrix.

It is yet a further object of the invention to provide a cross-point switch wherein each input waveguide is bit rate transparent (at least 10 Gb/sec).

It is another object of the invention to provide an effective M×N cross-point matrix switch wherein each input waveguide is capable of processing an optical signal comprising multi-discrete wavelength carriers so as to accommodate a combined multi-terabit/sec bit rate.

These and other objects are provided in accordance with a first aspect of the present invention which is an optical cross-point switch comprising: a first waveguide having an input end for receiving an optical signal and a second waveguide having a portion juxtaposed to the first waveguide and an output end for delivering the optical signal to a receiver. Coupling means are provided in the vicinity of the juxtaposed portion in order to selectively couple the optical signal from the first waveguide to the second. Preferably the coupling means is controlled by an applied external voltage.

In a preferred embodiment the switch comprises a matrix made up of a plurality of first and second waveguides intersecting generally at right angles. In a more particular embodiment the switch comprises an M×N matrix of first and second waveguides, intersecting at right angles. Preferably, the coupling means comprises a directional coupler or Y-branch guide associated with each intersection together with a reflection in the form of a mirror to direct the signal, selectively, from a first waveguide to a second waveguide. Preferably the switch can be incorporated directly into an ATM network.

BRIEF DESCRIPTION OF THE DRAWINGS

The invention will now be described in greater detail with references to the attached drawings wherein.

DETAILED DESCRIPTION OF THE INVENTION

Figure 2:
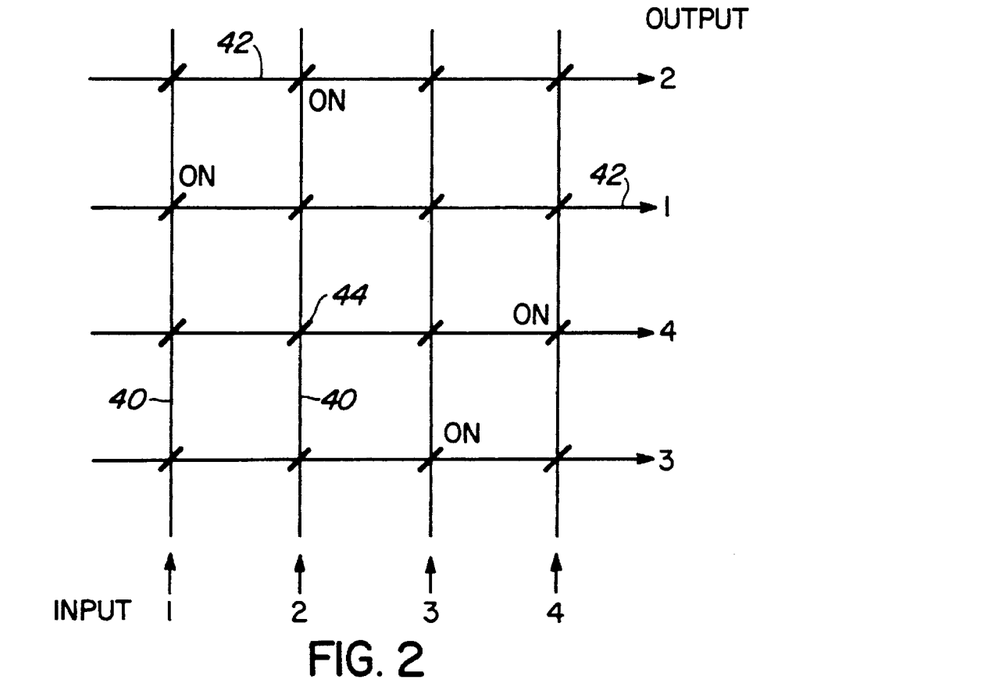
FIG. 2 is a schematic diagram of a 4×4 optical cross-point waveguide switch illustrating the principle of a M×N matrix switch.

As discussed previously FIGS. 1A to 1F illustrate X-branch, Y-branch and directional couplers as applied to optical cross-point switches as well as characteristics thereof. In view of physical limitation of such devices their incorporation into the prior art multiwaveguide, large scale, matrix-configurations is impractical. Multi-waveguide matrix configurations, as contemplated herein, consist of a plurality of intersecting input waveguides 40 and output waveguides 42 as illustrated schematically in FIG. 2. The diagonal line 44 at each intersection represents a reflecting device such as a mirror or Bragg grating. It is intended that the reflecting device 44 can be activated or deactivated so as to selectively reflect an optical signal on each of the input lines 40. As shown in FIG. 2, certain deflecting devices are shown as being 'on' which results in that input being transferred to the output row 42.

In an ideal situation the reflecting devices 44 should be capable of reflecting all of the signal in the associated waveguide when in an 'on' mode, while not interfering with propagation of the optical signal through the waveguide when not in an 'on' mode. This allows the switch to be defined as strictly non-blocking. At the same time each reflector in a column should be capable of power splitting so that an optical signal in any one input waveguide can be proportionally coupled to each of the output waveguides. This provides a broadcast capability. The manner in which this is accomplished at high speed while maintaining a compact configuration will now be described in relation to the present invention.

For the sake of simplification only a portion of the switch will be discussed and illustrated as, for example, in FIG. 3. In this figure a 2×2 switch is illustrated but this is not intended to limit the invention to this configuration. The concept is applicable up to at least a 16×16 cross-point switch and, if material requirements can be satisfied, even larger.

Figure 3:
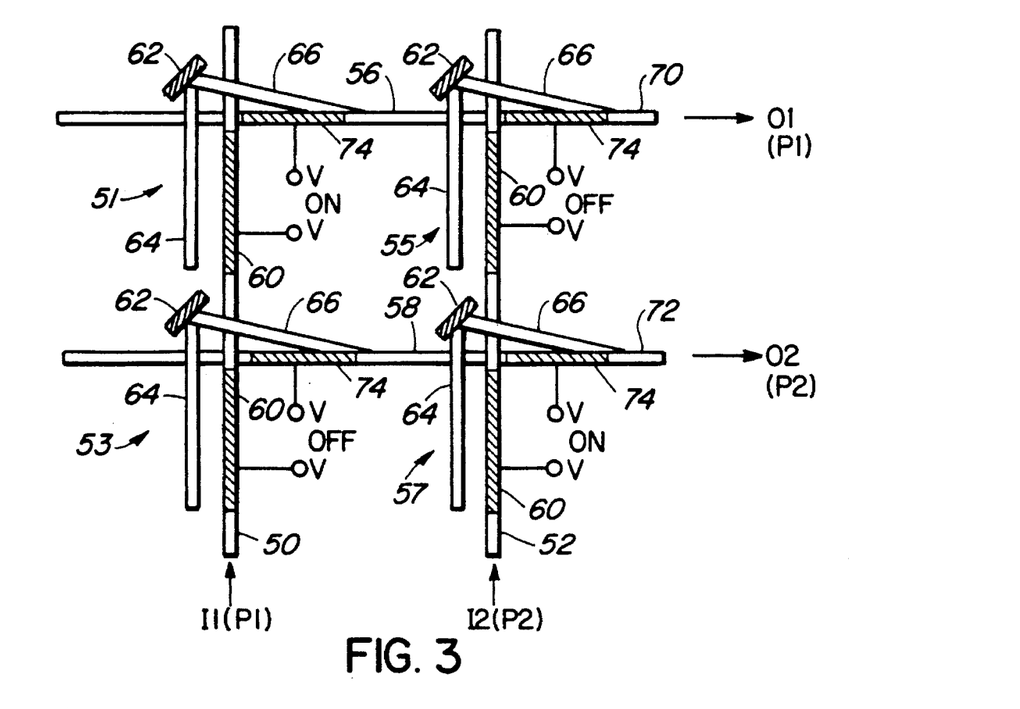
FIG. 3 is a plan view of a 2×2 cross-point switch using directional couplers associated with the input waveguides and Y-branch-guides associated with the output guides.

As shown in FIG. 3, each input waveguide 50,52 have directional couplers 51,53,55,57 associated therewith in the vicinity of its intersection with an output waveguide 56,58. Each directional coupler 51,53,55,57 has a PIN structure. Its top electrode 60 is connected to an appropriate supply (not shown) for the purpose of selectively applying an electrical bias to the waveguide. As discussed in Applicant's copending U.S. Application Ser. No. 08/292,205, now U.S. Pat. No. 5,502,783, the contents of which are incorporated herein by reference, directional couplers may be tuned by electro-optic effect (reverse bias on a p-n junction) or by free carrier injection (forward bias on p-n junction) to selectively couple an optical signal from one waveguide to a second waveguide lying in close proximity. A reflecting device 62 such as an etched mirror is strategically positioned on the waveguide 64 of the directional coupler so as to redirect the optical signal into each Y-branch guide 66 joined to the output waveguide 56,58. From each Y-branch guide 66 the signal is transferred into the associated output guide 56,58 for detection and further processing at the receiver end 70,72. As shown in FIG. 3, Y-branch guide 66 in each case also has an electrode 74 for controlling the coupling of light in the Y-branch 66 into the output guide 56,58.

IN FIG. 3, two of the directional couplers 51,57 are shown as being in the 'on' mode. Thus, as shown, the signal I1 is transferred to output 70 via the directional coupler 51 and the signal I2 is coupled to 72 via directional coupler 57. This is, of course, by way of example only and other combinations of 'on' and 'off' directional couplers are clearly contemplated by the invention.

The directional couplers in FIG. 3 are laterally coupled, that is, the coupler waveguides and the input and output waveguides are on the same or substantially the same plane, but offset laterally. One of the significant advantages of optical transmission systems involving waveguides is that signal can cross waveguides without being affected.

Figure 4A:
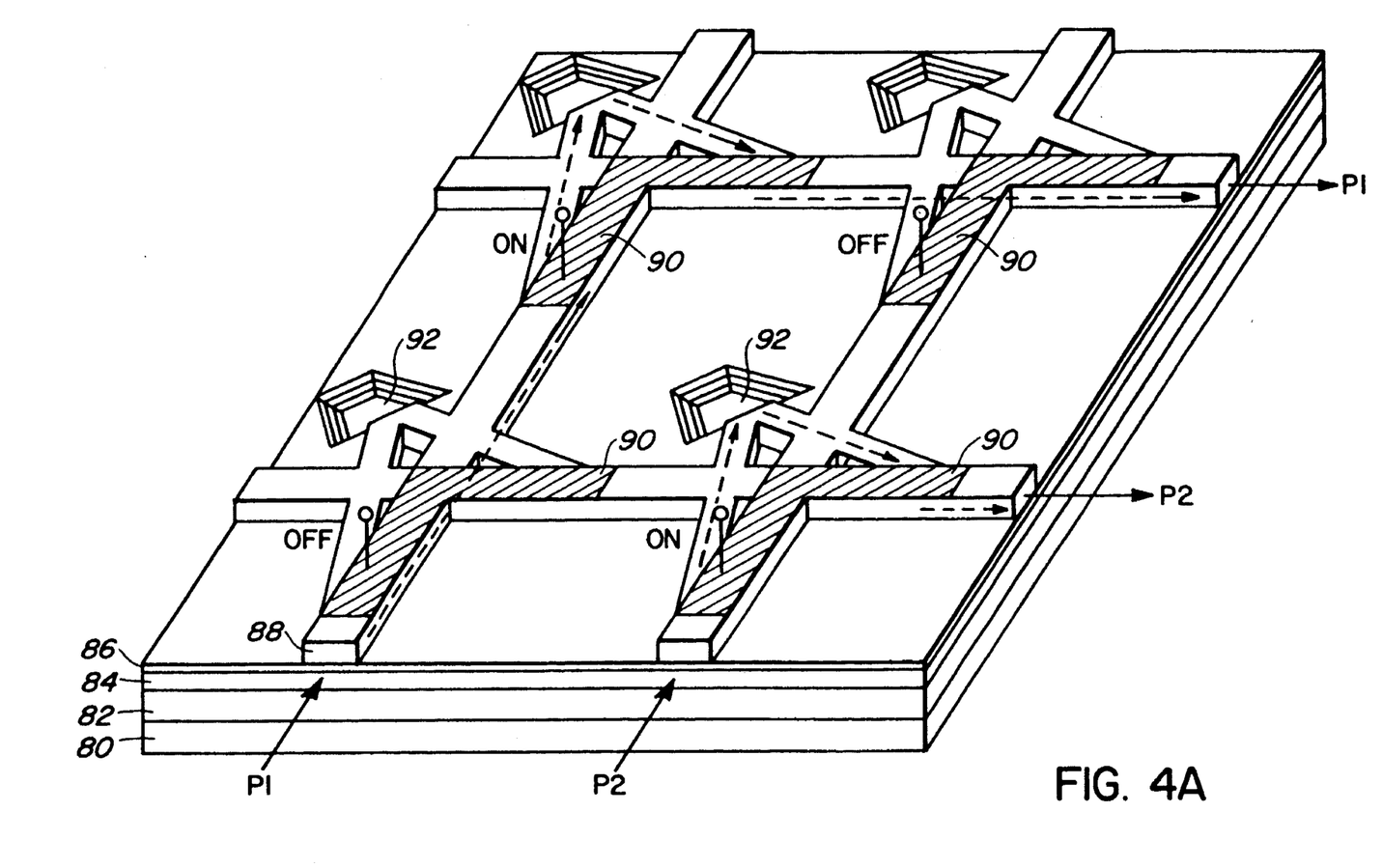
FIG. 4A is a 2×2 cross-point switch using Y-branch guides associated with both input and output waveguides.
Figure 4B:
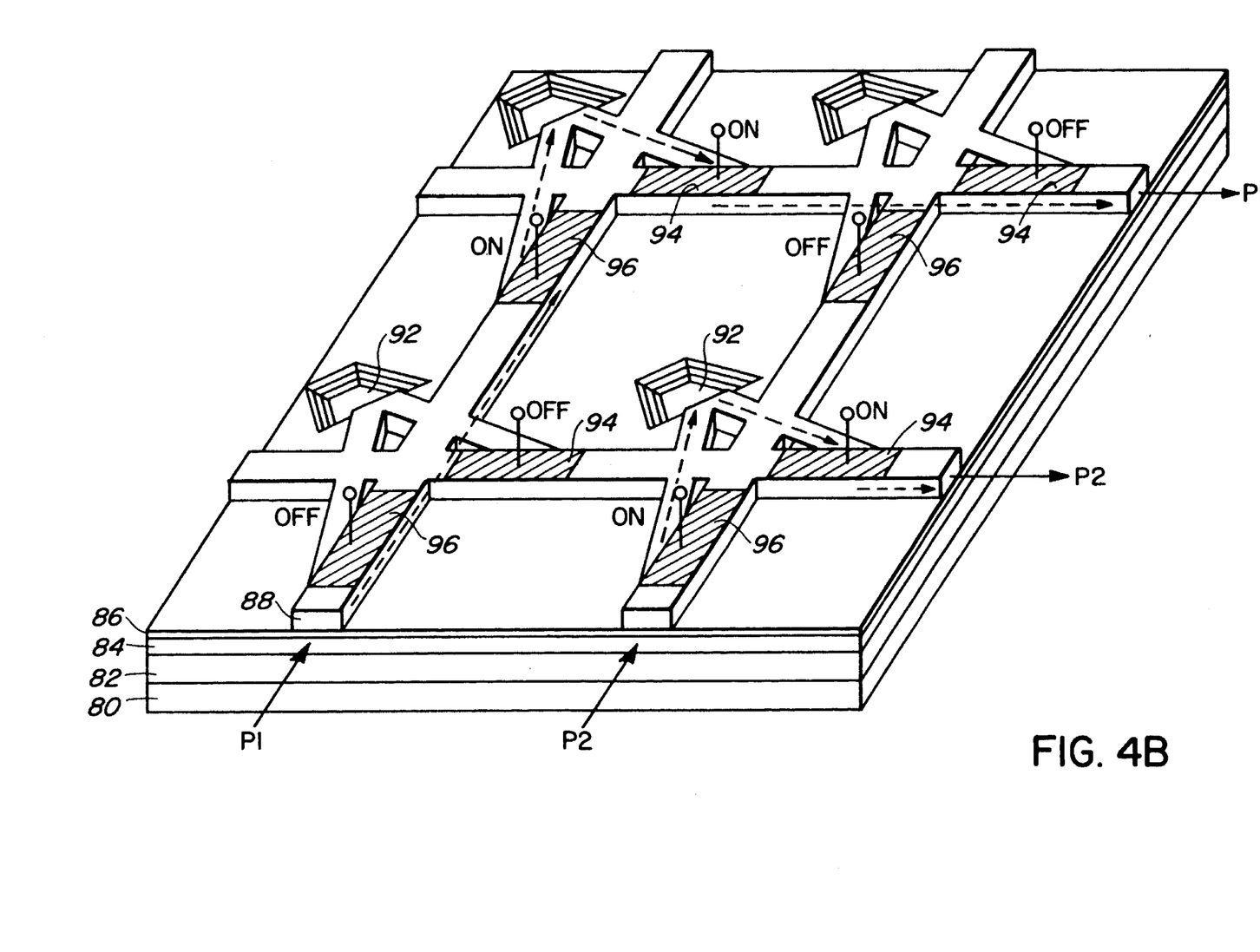
FIG. 4B shows the switch of FIG. 4A with separate electrodes for each Y-branch guide.

The physical architecture of an alternative structure to the cross-point switch of FIG. 3 is shown in the simplified partial perspective view of FIG. 4A. In this drawing, which shows the substrate 80, lower cladding layers 82, waveguide layer 84, upper cladding layer 86, as well as the waveguide matrix layer 88 are also shown. A Y-branch coupler is employed rather than a directional coupler. The hatched regions 90 represent electrodes on top of the directional coupler guides. The angled portion 92 at the end of each guide is a mirror having an angle of approximately 45° to reflect the optical signal into the Y-branch guide. The mirrors are etched deeply over the lower cladding layer. The cross-sectional view of the matrix switch shown in FIG. 4A is just an example and the present invention is not limited to this structure. For example, FIG. 4B illustrates a variation on the structure of FIG. 4A. In FIG. 4B each waveguide has a separate electrode in association with the Y-branch coupler. Thus, electrodes 90 in FIG. 4A are replaced with electrodes 94,96 in FIG. 4B.

Figure 5:
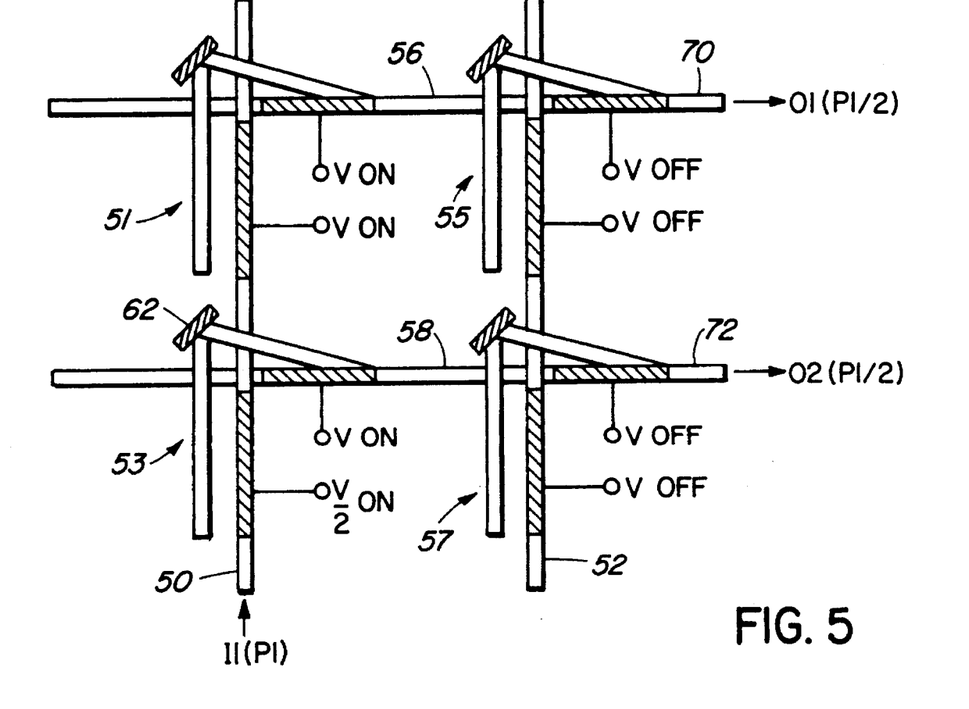
FIG. 5 is a plan view of a 2×2 switch for a full broadcast application.

FIG. 5 is a plan view of the switch shown in FIG. 3 but in a full broadcast mode. The directional couplers 51,53 in an input waveguide 50 are turned 'on' with proportional biases shown as and V/2 and V. This results in one-half of the input signal being reflected by the directional coupler 53 and output at 72 while the remainder of the input is output on 70. Thus for an input signal I1 of a value P1, one-half appears at 70 as P1/2 and the rest appears at 72 as P1/2.

Figure 6:
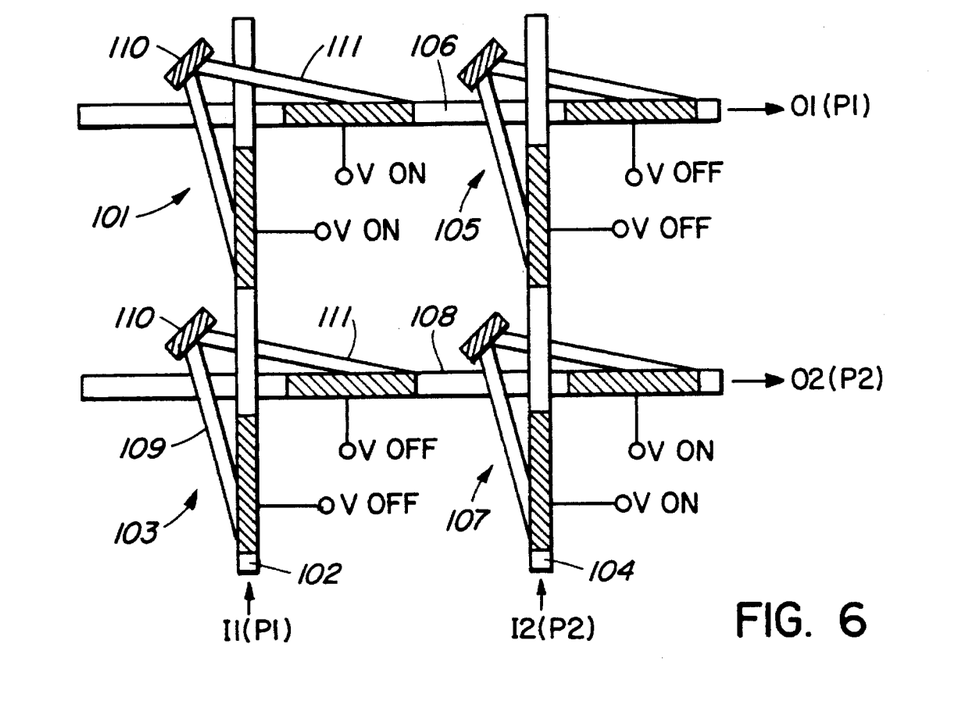
FIG. 6 is a plan view of a switch having Y-branch guides associated with both waveguides in a strictly non-blocking application.

FIG. 6 illustrates a variation on the configuration of FIG. 3 and is similar to the embodiment of FIG. 4. In this case the coupling is by way of Y-branch waveguides 101,103,105 and 107 in both the input waveguides 102,104 and output waveguides 106,108. As is known the index of refraction of Y-branch waveguides can be controlled by electro-optic, free carrier or thermal effects. In turn, the index of refraction can be used to determine whether the optical signal propagates through the input waveguide or whether it is directed into the branch guide. The signal which is deflected into the branch guide 109 is reflected by the etched mirror 110 and redirected into the complementary Y-branch guide 111 and hence into the output waveguide 106,108. The structure shown in FIG. 6 is intended for a strictly non-blocking application in as much as only one coupler in an input waveguide is turned on at any given instant in time. Although not shown in the figures it is to be understood that a full broadcast cross-point switch may be constructed using Y-branch waveguides with proportional voltage control.

Figures 7A, 7B:
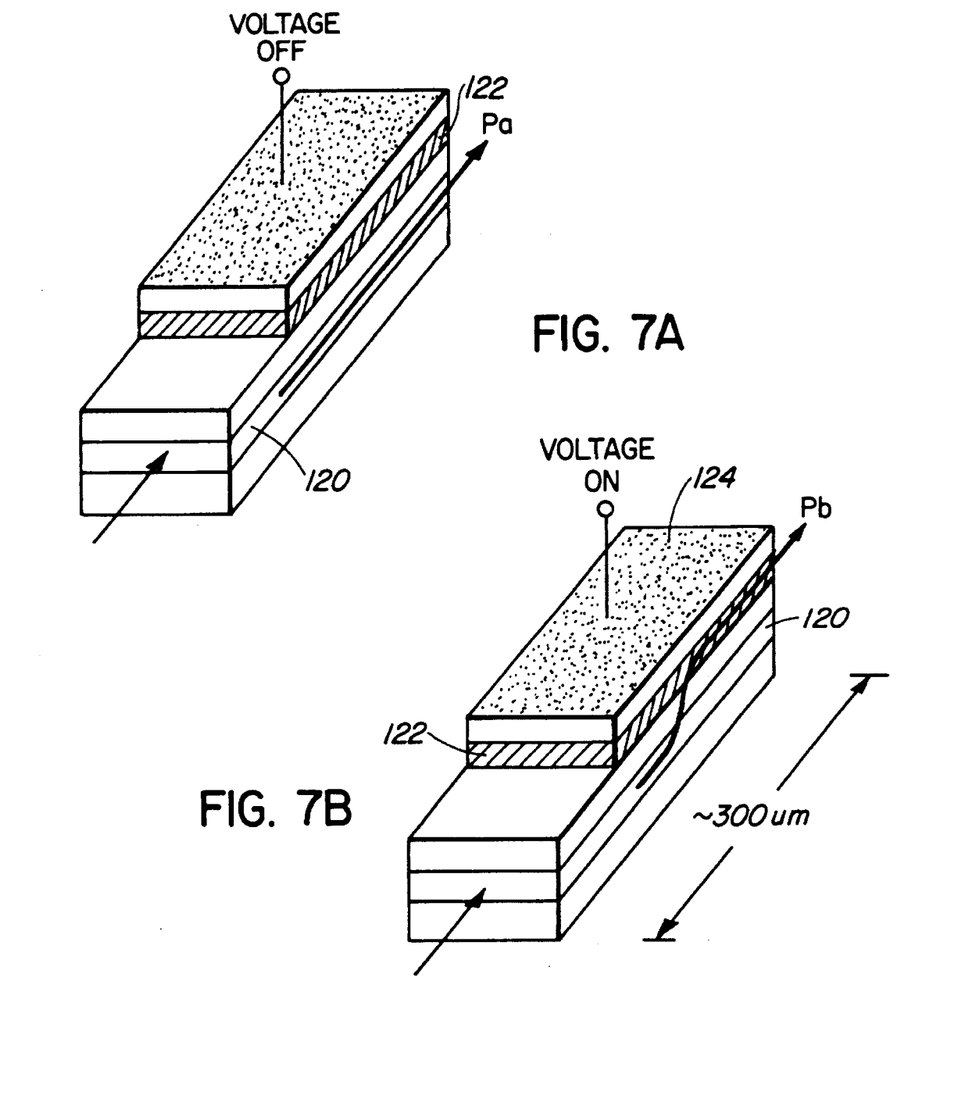
FIG. 7A, 7B and 7C refer to a "normally off" vertically coupled directional coupler optical switch.

The cross-point switch of the present invention can also be fabricated using vertically coupled directional couplers. FIG. 7A shows in a perspective view a normally 'off' digital optical switch. In this structure light in one or the other waveguide continues to flow in that waveguide until caused to be coupled into the other waveguide by a current or voltage bias applied to the electrode. In FIG. 7A and in the following illustrations the optical signal is normally in the lower waveguide 120 unless 'switched' to the top waveguide 122. Although this is the preferred arrangement, the invention is not limited to such a structure.

Figure 7C:
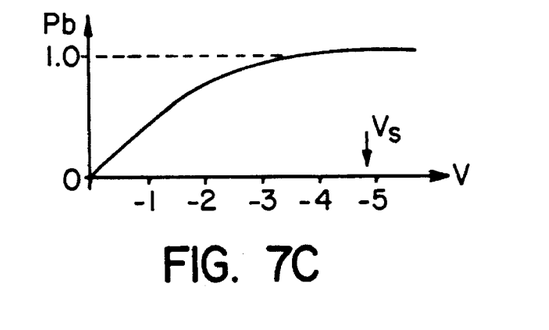

FIG. 7B shows the light path when a voltage or current is applied to the electrode 124 so as to turn 'on' the coupler. Under these conditions the optical signal is coupled to the upper waveguide 122 and it will continue to propagate therethrough, for digital applications or, if analog, switched back to the lower waveguide 120. A plot of relative power in waveguide 122 as a function of bias voltage is shown in FIG. 7C. In this example a bias of approximately −3.5 V causes virtually all of the signal to be coupled into the upper waveguide 122. Hence, it can be seen that by switching the bias voltage between 0 and −3.5 V, it is possible in effect to create a digital switch.

Figure 8:
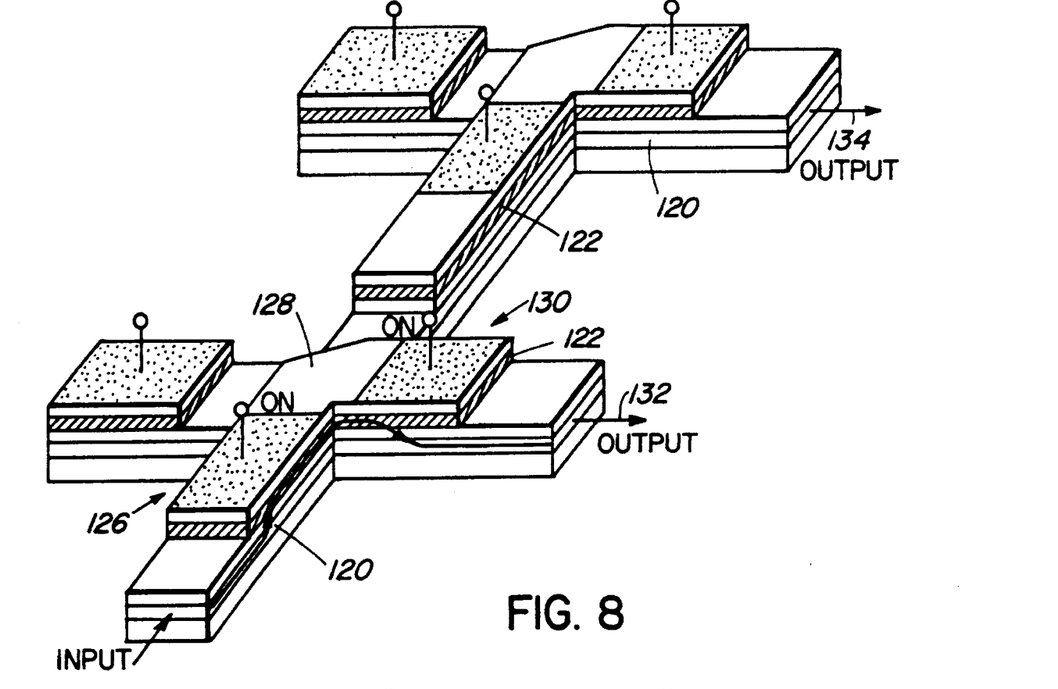
FIG. 8 is a perspective view of a 1×2 switch with a vertically coupled directional coupler.
Figure 9:
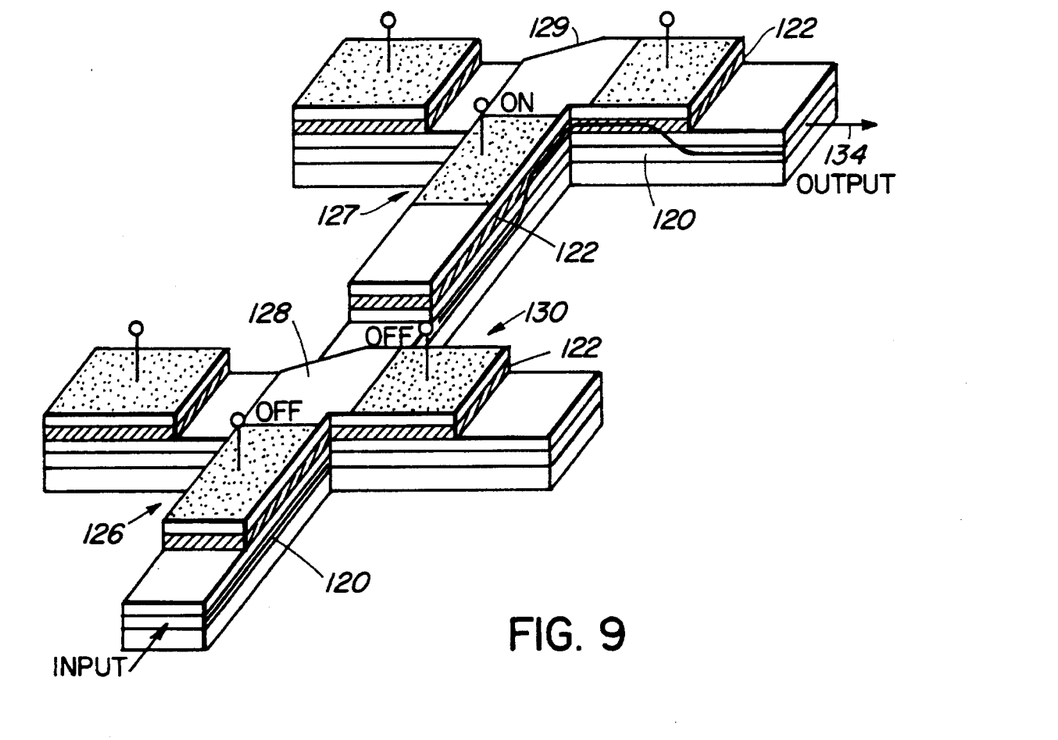
FIG. 9 is the device shown in FIG. 8 with an alternate output path.

The effect shown in FIGS. 7A to 7C will now be described in relation to a cross-point switch with reference to FIGS. 8 and 9. In FIGS. 8 and 9 a 1×2 switch is illustrated although it is to be understood that an 16×16 switch is contemplated by the invention. As shown in FIG. 8 the optical signal is launched into the lower waveguide through which it propagates until in the vicinity of the first directional coupler 126. As this coupler is in an 'on' mode, the signal is coupled into the upper waveguide 122. The reflecting mirror 128 in the upper waveguide 122 directs the signal into the complementary arm of the upper waveguide. The directional coupler 130 associated with the complementary arm is also in an 'on' mode and hence the signal is coupled back into the lower guide 120 and is delivered to 132 output. Since substantially all of the input signal is coupled to the upper guide by the directional coupler there is no output at 134. As previously discussed the corner mirrors shown in these figures are etched down and close to the top of the lower waveguide.

Figure 10:
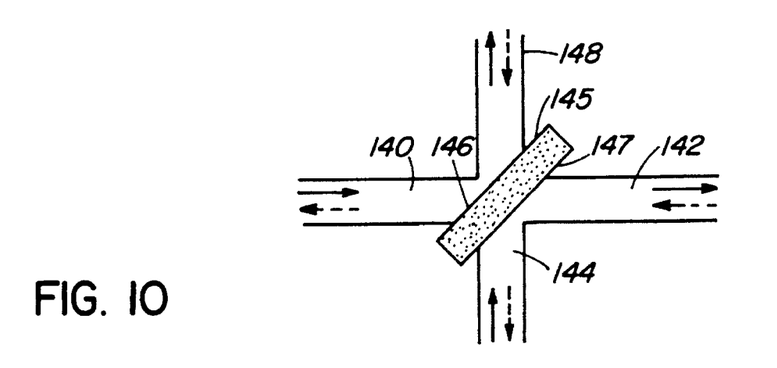
FIG. 10 is a top view of the mirror position in the vertical directional coupler of FIGS. 8 and 9 for a rearrangeable non-blocking switch.

FIG. 9 relates to the situation in which the directional coupler associated with output 132 is off while the coupler associated with output waveguide 134 is in an 'on' mode. Again, the optical input signal is launched into the lower waveguide 120. As the first directional coupler 126 is off there is no coupling of the signal to the associated upper waveguide and the complete signal propagates through to the vicinity of the second directional coupler 127. Since the second directional coupler 127 is in the 'on' mode the optical signal is coupled to the upper waveguide where it is reflected at right angles by the mirror 129. The directional coupler in the complementary arm is also 'on' which couples the signal back to the lower guide 120 where it is output at 134. As indicated previously this concept is applicable in cross-point switches employing a larger number of input and output waveguides, for example, an 8×8 matrix. A particularly advantageous property of this structure is that the reflecting mirror associated with the upper waveguide can be located more or less centrally so that it can be used to reflect signals orthoganally. This is shown in greater detail in FIG. 10 which is a top view of the mirror section. Thus with reference to FIG. 10, the portion 140 of waveguide 142 to the left of the waveguide 144 can be used as a second input waveguide. The directional coupler (not shown) on this arm is independently controllable so that a signal launched in this waveguide can be coupled into the upper waveguide for reflection by the mirror 146 if suitably located in the structure. This reflected signal can be subsequently coupled back down into the lower waveguide by a directional coupler (not shown) on the guide 148. Thus this waveguide becomes one of a different set of output waveguides. Hence a signal in waveguide 140 can be reflected to waveguide 148 by surface 145 of mirror 146 while at the same time a signal on guide 144 can be reflected to guide 142 by surface 147 of mirror 146. This concept will be discussed later in connection with the implementation of an 8×8 matrix in a 16×16 application.

Figure 11A:
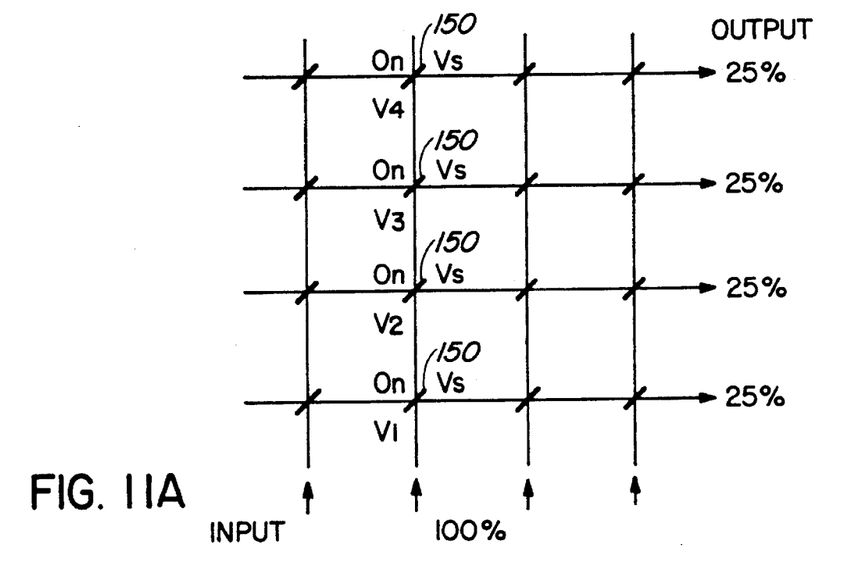
FIG. 11A is a schematic diagram of a cross-point matrix switch in a power splitting broadcast application having switches as shown in FIGS. 8 and 9.
Figure 11B:
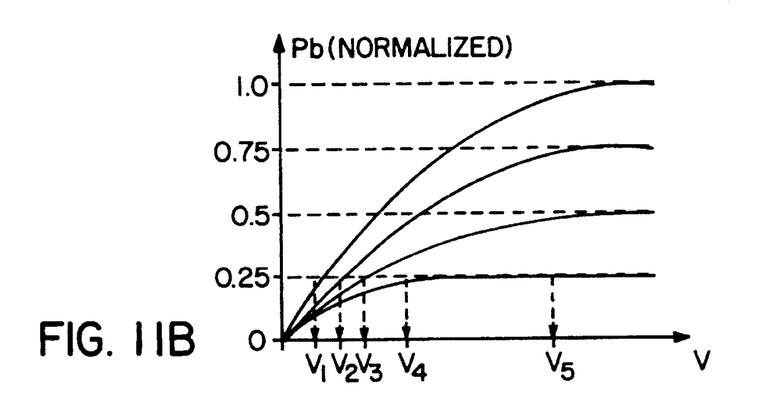
FIG. 11B is a graph of optical power vs. input voltage for the device of FIG. 11A.

The foregoing description of a vertically coupled directional coupler refers to a strictly non-blocking configuration. The structure is also applicable in an broadcast system and this is shown schematically in FIG. 11A. Each directional coupler 150 is capable of splitting the optical power of the input signal proportionally so that an equal power level is delivered to each output waveguide. In FIG. 11A a 4×4 switch is depicted and hence each coupler transfers 25% of the total input power into each of the four output waveguides. This power splitting ratio is, of course, dependent on the number of elements in the cross-point matrix. FIG. 11B graphically indicates the relative bias voltage applied to each directional coupler in order to obtain the four equal output power components.

Figure 12A:
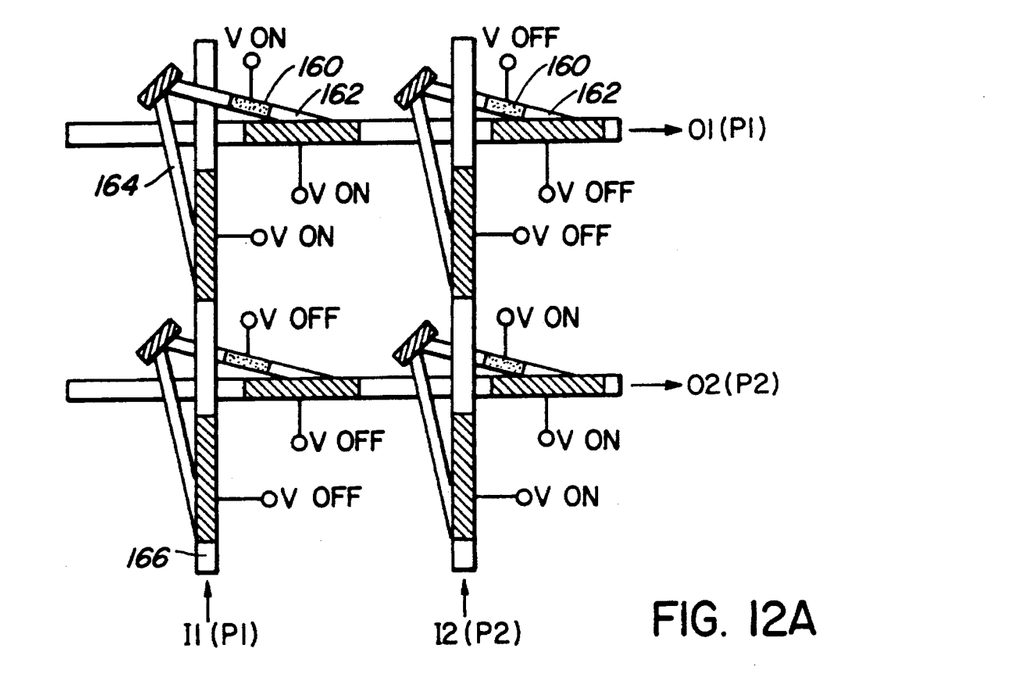
FIG. 12A is a plan view of a 2×2 switch with optical gain.

A significant aspect of the cross-point switch structure of the present invention is the possibility of incorporating optical amplifiers in the active branch guides of the optical couplers. The optical amplifiers can be used to compensate for coupling losses, propagation losses as well as loss due to incomplete reflection at the mirror surfaces. Further, an optical amplifier when in an 'off' mode is a good optical absorber. Therefore, all the light being coupled to the 'off' branch amplifier can be totally absorbed. This results in a considerable reduction in inter-channel cross-talk. FIG. 12A illustrates a laterally coupled 2×2 cross-point switch with optical amplifiers in the branch arm 162 of the Y-branch waveguides. It is to be understood, of course, that the optical amplifier can be incorporated in either waveguide of the vertically coupled structure previously discussed. Other alternatives not illustrated include incorporating the optical amplifier in branch arm 164 or in the input feed-guide 166.

Figure 12B:
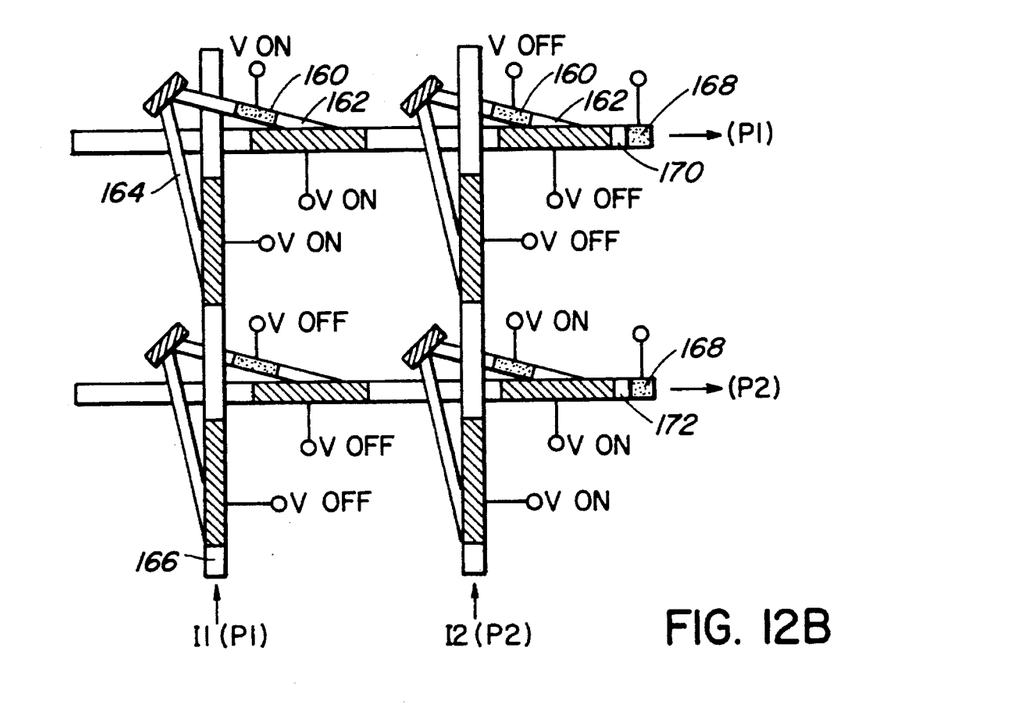
FIG. 12B is a plan view of the 2×2 switch of FIG. 12A with photodetectors in the output waveguides.

In certain applications it will be necessary to detect the output with a detector in order to provide an electrical signal. This can be accomplished by integrating a photodetector monolithically at the ends of the output waveguides. FIG. 12B illustrates a 2×2 cross-point switch having optical amplifier 160 in branch arm 162 and photodetector 168 in output waveguides 170,172. In FIG. 12B separate electrodes are provided at each corner so as to independently control the operation of the input and output Y-branch waveguides.

Figure 13:
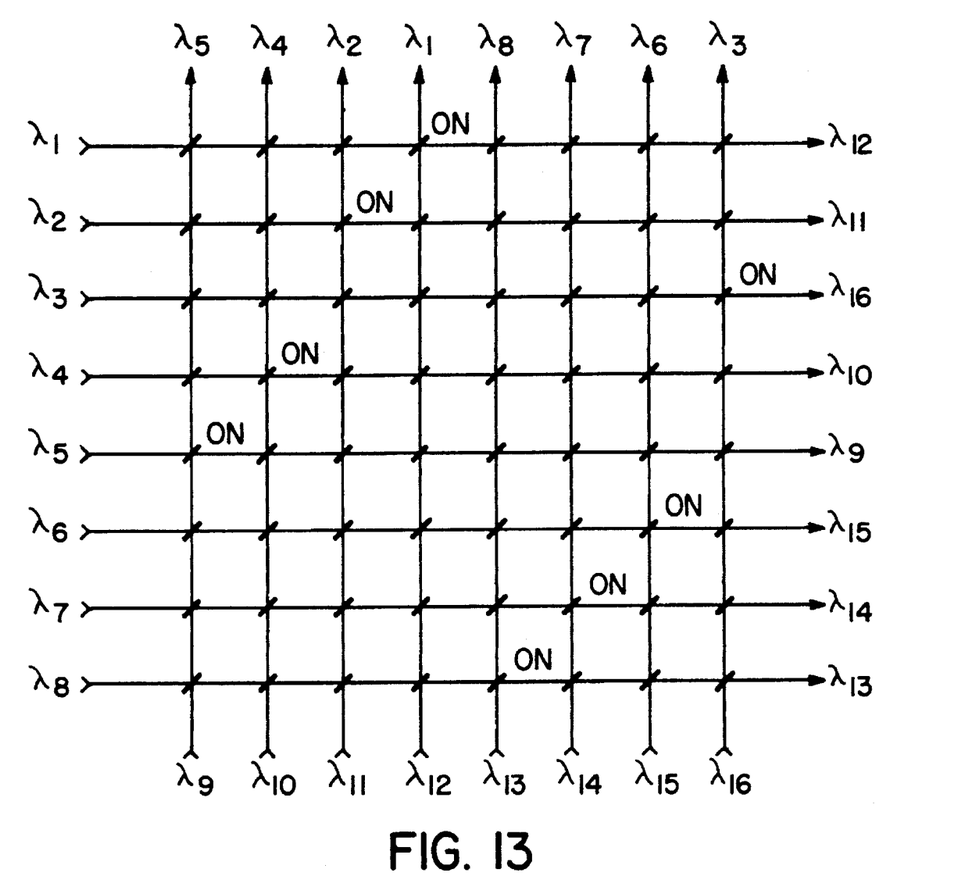
FIG. 13 is a layout for a rearrangeable 16×16 optical cross-point switch using an 8×8 matrix switch.

As set out hereinbefore, it is an object of the present invention to provide an optical cross-point switch capable of processing 16 input channels into 16 output channels. The manner in which this is achieved by the invention is illustrated schematically in FIG. 13. In a preferred embodiment the configuration of each cross-point is based on the structure shown in FIGS. 8, 9 and 10, that is, vertically coupled directional couplers with a 45° mirror to establish the right angled reflection. In this configuration the input signals are launched into the lower waveguide with the active branch of the directional coupler being in the upper waveguide. Upon execution of the crossover the signal is returned to the lower waveguide for delivery of the signal to the output receiver. In order to achieve the effective 16×16 cross-point switch utilizing an 8×8 matrix it is necessary for the reflecting mirror at each intersection to be capable of processing two input signals as previously discussed. As shown in FIG. 13, input lines λ1 to λ8 are via the rows at the left hand side of the matrix. The outputs λ1–λ8 are via the columns at the top of the matrix. Similarly the input lines λ9–λ16 are via the columns at the bottom of the matrix while the resulting outputs λ9–λ16 are via the rows at the right hand side. The arrangement of turned 'on' directional couplers in FIG. 13 has been selected to show how all 16 inputs can be switched utilizing the double mirror concept. Other arrangements are, of course, possible for a rearrangeable non-blocking switch. Similarly a different arrangement will be used in a broadcast mode.

Figure 14:
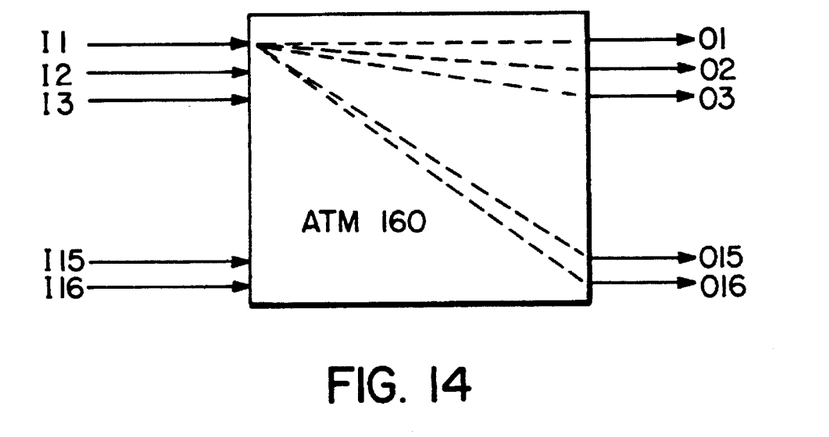
FIG. 14 illustrates a 16×16 switch in an ATM application.

FIG. 14 represents a 16×16 switch in an ATM. Each of the inputs I1–I16 of FIG. 14 is capable of containing multiple wavelength channels, say, for example, each contains eight different wavelength channels wherein each wavelength channel has a bit rate of 10 Gb/s. By combining a 16×16 switch with optical tunable filters which are capable of processing eight wavelength channels, the combined switching rate is 1.28 Terabits/sec. This is, of course, an example only and is not intended to limit the invention.

In a preferred embodiment the cross-point switch is fabricated within a chip dimension of 5 mm×5 mm utilizing current wafer fabrication technology. A particularly suitable material is a III-V compound alloy/substrate such as GaAs or InP based material systems. It is also within the scope of the invention to use a silicon substrate or in fact a polymer material, glass or silica. Other materials include SiGe alloy, photorefractive materials such as $LiNbO_3$, and II-VI compound alloys.

The directional couplers and the Y-branch guides can be designed as either analog or digital switches. The analog switch is based on the two-mode interference which can be made in short device length but is sensitive to wavelength change, polarization state and fabrication variations. The digital switch is based on only adabatical one mode evolution which is less sensitive to polarization state as well as wavelength and fabrication variations but which requires a longer device length.

While particular embodiments of the invention have been discussed and illustrated it will be apparent to one skilled in the art that modifications to these embodiments or alternative embodiments are possible. For example, 1×N or N×1 switch matrices are contemplated by the invention. The switch can be controlled by locally induced thermal optic effect. It is to be understood, however, that such modifications and alternatives are within the scope of the present invention as defined by the appended claims.

I claim:

1. An optical cross-point switch comprising:

a first waveguide having an input end for receiving an optical signal;

a second waveguide intersecting said first waveguide, said second waveguide having an output end for selectively delivering said optical signal to a receiver;

a switching element at the intersection of said first and second waveguides, said switching element having first and second interconnected y-branch optical couplers, said first optical coupler having a first branch waveguide with a first end diverging from the first waveguide and a second distal end, said second optical coupler having a second branch waveguide with a second end merging with said second waveguide and a first distal end, said first and second distal ends being optically interconnected by reflecting means having n incident angle of less than 90°; and electrode means associated with said switching element whereby an electrical bias selectively applied to said electrode means causes said optical signal to be switched from said first waveguide to said waveguide.

2. An optical cross-point switch as defined in claim 1, having a plurality of laterally spaced first waveguides.

3. An optical cross-point switch as defined in claim 1, having a plurality of laterally spaced second waveguides.

4. An optical cross-point switch as defined in claim 1, having a plurality of laterally spaced first and second waveguides forming a matrix.

5. An optical cross-point switch as defined in claim 4, said reflecting means being an etched mirror.

6. An optical cross-point switch as defined in claim 4, said reflecting means being a distributed Bragg reflector having an incident angle of approximately 45°.

7. An optical cross-point switch as defined in claim 4, said first and second Y-branch optical couplers having asymmetrical arms.

8. An optical cross-point switch as defined in claim 4, a different optical signal being launched into each of said plurality of first waveguides.

9. An optical cross-point switch as defined in claim 8, each of said different optical signals being carried on a discrete wavelength carrier.

10. An optical cross-point switch as defined in claim 1, fabricated on a III–V compound alloy substrate.

11. An optical cross-point switch as defined in claim 10, said III–V compound alloy being GaAs based material.

12. An optical cross-point switch as defined in claim 10, said III–V compound alloy being InP based material.

13. An optical cross-point switch as defined in claim 1, fabricated on a silicon substrate.

14. An optical cross-point switch as defined in claim 1, fabricated on a polymer substrate.

15. An optical cross-point switch as defined in claim 1, fabricated on a Si/Ge alloy.

16. An optical cross-point switch as defined in claim 1, fabricated on photorefractive material.

17. An optical cross-point switch as defined in claim 16, said photorefractive material being $LiNbO_3$.

18. An optical cross-point switch as defined in claim 1, fabricated on silica based material.

19. An optical cross-point switch as defined in claim 1, fabricated in a II–VI compound alloy substrate.

20. An optical cross-point switch as defined in claim 1 having an optical amplifier in one of said first and second optical couplers.

21. An optical cross-point switch as defined in claim 1 having an optical amplifier in one of said first and second waveguides.

22. An optical cross-point switch as defined in claim 1, said receiver being an optical photodetector.

23. An optical cross-point switch as defined in claim 22, said photodetector being monolithically integrated at said output end.

* * * * *